UNITED STATES PATENT OFFICE.

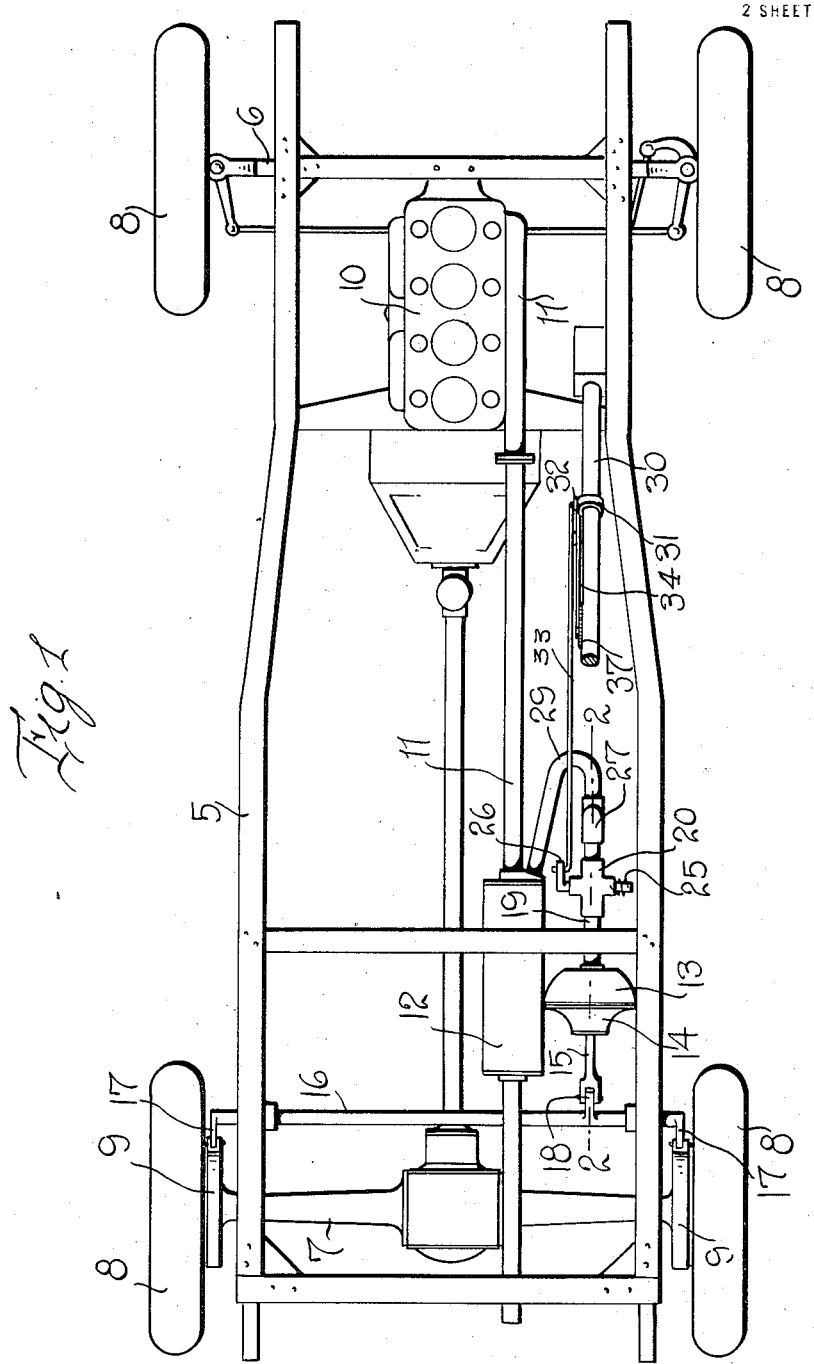

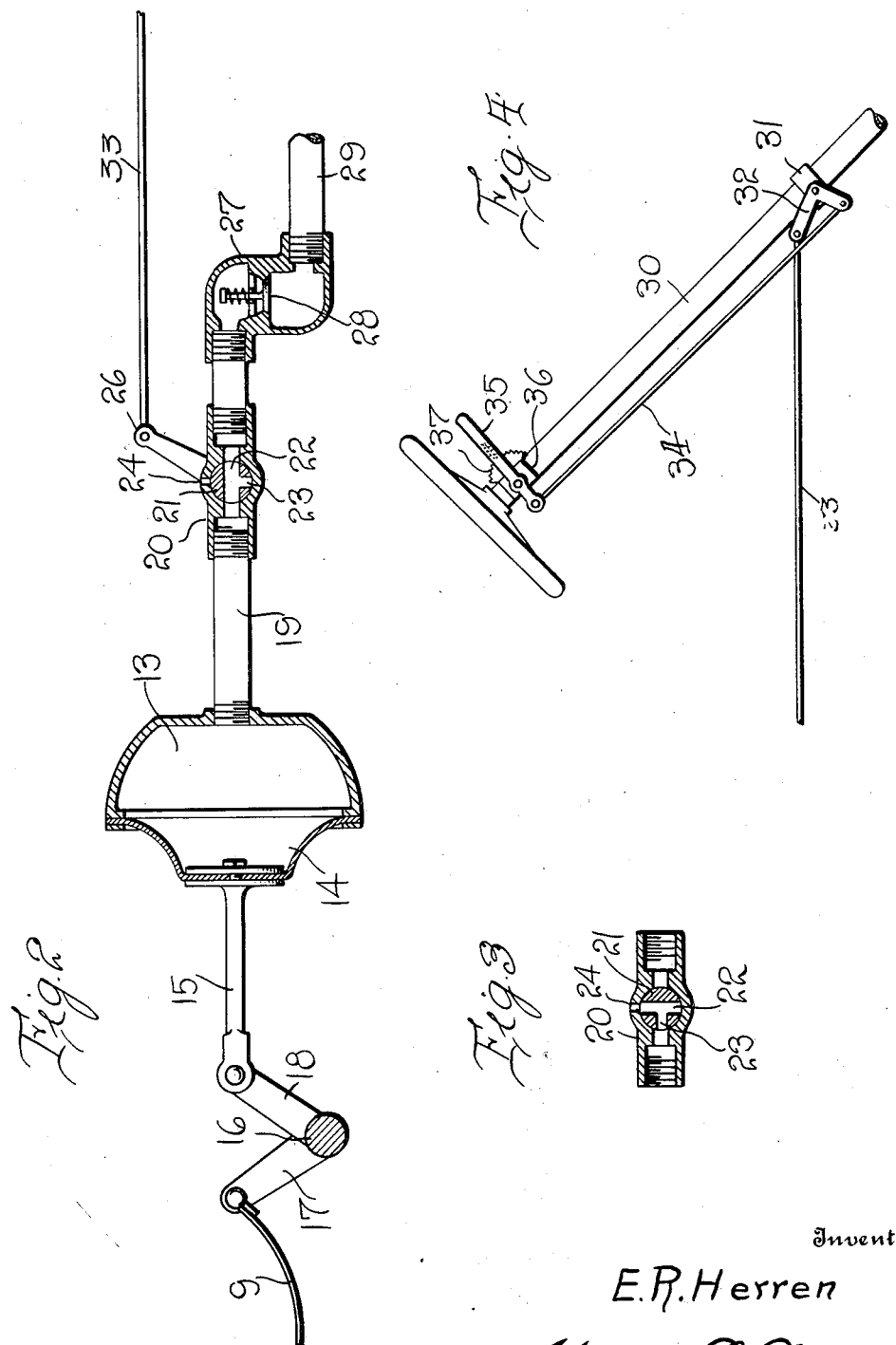

EARL R. HERREN, OF LORAIN, OHIO.

VEHICLE-BRAKE.

1,244,606.   Specification of Letters Patent.   Patented Oct. 30, 1917.

Application filed July 17, 1915. Serial No. 40,442.

*To all whom it may concern:*

Be it known that I, EARL R. HERREN, a citizen of the United States, residing at Lorain, in the county of Lorain and State of Ohio, have invented certain new and useful Improvements in Vehicle-Brakes, of which the following is a specification, reference being had to the accompanying drawings.

This invention relates to an improved vehicle brake, and has for its primary object to provide a brake particularly designed for use upon motor vehicles, which is effectively actuated by the creation of a vacuum.

The invention has for another and more specific object to provide a vacuum brake wherein a vacuum cylinder is employed having a flexible diaphragm to which the brakes are connected, and manually controlled means for establishing communication between the vacuum cylinder and the exhaust of the motor so that the forcibly ejected exhaust gases will withdraw the air from said cylinder and create a vacuum therein.

The invention has for another of its specific objects to provide an improved type of manually operable valve whereby the vacuum cylinder may be connected to the exhaust of the motor or such communication cut off and atmospheric air supplied to the vacuum cylinder whereby the brakes are released.

The invention has for a further general object to produce a simply constructed and highly effective and reliable vacuum brake which may be readily applied to various types of motor vehicles now in general use without necessitating any material alterations in the construction thereof.

With the above and other objects in view, my invention consists in the novel features of construction, combination and arrangement of parts to be hereinafter more fully described, claimed and illustrated in the accompanying drawing, in which, Figure 1 is a plan view of a motor vehicle frame, showing my improved vacuum operated brake mounted therein;

Fig. 2 is an enlarged section taken on the line 2—2 of Fig. 1, showing the operating valve in position to set or apply the brakes;

Fig. 3 is a similar detail sectional view through the valve, showing the same in position to establish atmospheric communication with the vacuum cylinder, whereby the vacuum is destroyed and the brakes released; and Fig. 4 is a detail elevation illustrating the operating means for the valve mounted upon the steering post.

Referring in detail to the drawing, 5 designates the chassis or frame of an automobile, and 6 and 7 the front and rear axles, respectively, upon which the supporting wheels 8 are mounted. The rear axle 7 is provided with the usual brake drums adjacent to its opposite ends, which are adapted to be frictionally engaged by the metal brake bands 9. 10 indicates the engine or motor for driving the vehicle and 11 the exhaust pipe which carries the burned gases rearwardly and discharges the same. In this exhaust pipe, a suitable muffler, indicated at 12, is arranged.

In carrying out my invention, I provide a vacuum cylinder 13 having a flexible diaphragm head 14, preferably of rubber. The cylinder 13 may be mounted in any desired manner upon the frame 5 of the vehicle, and to the diaphragm 14, a rearwardly extending rod or stem 15 is connected. A transversely disposed rock shaft 16 is journaled at its ends in suitable hanger bearings on the frame 5 and is provided adjacent its opposite ends with the crank arms 17 which are connected to the free ends of the respective brake bands 9. An additional arm 18 is also fixed upon the rock shaft 16 and is loosely connected to the end of the rod or stem 15.

A pipe 19 is connected at its forward end to the vacuum cylinder 13 and in a cruciform coupling 20, connected to said pipe, the rotary valve member 21 is mounted. The valve member 21 is provided with a main port 22. A relatively small port 23 is provided in one side of the valve member and communicates with the port 22. The coupling member 20 is formed with an air inlet opening 24 with which this latter port 22 is adapted to register, and the valve member 21 is normally held yieldingly against rotation with the port 22 in communication with this opening, by means of a coil spring 25. One end of this spring is fixed to the coupling 20 while the other end thereof is secured to the projecting end of the valve 21. The other end of the valve member is provided with an angularly disposed arm 26 to which the operating means, to be later referred to, is connected.

A casing 27 is threaded upon one arm of the coupling member 20, and in this casing the spring-held check valve 28 is mounted. This check valve normally closes communication between the pipe connection 19 to the vacuum cylinder and a pipe 29 which is connected at one of its ends to the muffler casing 12 and has its other end connected to the check valve casing 27.

30 designates the usual steering post through which the rotatable steering rod extends; and upon a collar 31, clamped upon said post, the bell crank lever 32 is fulcrumed. A longitudinally disposed connecting rod 33 is pivotally connected at its forward end to one arm of this bell crank while the other or rear end of the rod 33 is similarly connected to the arm 26 of the rotatable valve member 21. The lower end of a rod 34 is connected to the other arm of the bell crank lever 32 and has its upper end connected to an operating lever 35 which is mounted upon a bracket plate 36 fixed to the upper end of the steering post adjacent to the steering wheel. This operating lever 35 may be provided with the usual spring pressed dog for engagement with the teeth of a rack 37 on the bracket plate 36.

As above stated, in the normal position of the valve member 21, atmospheric air may enter through the port 22 and the port 23 of the valve member into the vacuum cylinder 13. When it is desired to apply the brakes, the lever 35 is actuated so that the connecting rod 33 is shifted to rotate the valve member 21 and close the air intake opening 24 while the port 22 in said valve member will connect the opposite longitudinally extending branches of the coupling 20. The exhaust gases being driven through the pipe 11 and muffler 12, create a suction through the pipe 29 to open the spring-held check valve 28 and withdraw the air from the cylinder 13 through the open valve 21 so that a vacuum is created therein and the diaphragm head 14 drawn inwardly. Thus, the rock shaft 16 is rotated and the brake bands 9 are contracted upon the brake drums. The brakes will thus be instantaneously applied and the vehicle quickly brought to a stop. When pressure on the lever 35 is released, the spring 25 uncoils and acts to return the valve member to its normal position and again establish atmospheric communication with the cylinder 13 so that the vacuum therein is destroyed and the brakes are released.

From the foregoing description, taken in connection with the accompanying drawing, it will be seen that I have produced a simply constructed vacuum brake which is primarily actuated through the medium of the exhaust of the engine cylinder. The several parts of the invention are quite simple in construction so that the device can be manufactured at comparatively small cost and readily applied to the ordinary motor driven vehicle without altering the construction thereof. It will, of course, be apparent that pedal actuated means may be provided for operating the controlling valve 21, or any other suitable means devised for this purpose.

The invention is also susceptible of a great many other modifications in the form, proportion and arrangement of the several elements and I, therefore, reserve the privilege of resorting to all such legitimate changes as may be fairly embodied within the spirit and scope of the invention as claimed.

Having thus fully described my invention, what I desire to claim and secure by Letters Patent is:—

The combination with a motor driven vehicle having an exhaust pipe and a muffler interposed therein, of a cylinder provided with a flexible diaphragm head, means operatively connecting said head to the vehicle brakes, a pipe connecting said cylinder to the inlet end of the muffler contiguous to the exhaust pipe, a check valve arranged in said pipe connection to normally close communication between the muffler and the cylinder, a rotary valve interposed in said pipe between the check valve and said cylinder and normally establishing communication between said cylinder and the atmosphere, and means operatively connected to said valve to rotate the same and cut off communication with the atmosphere and establish communication between the muffler and said cylinder whereby a suction is created through the pipe connection by the force of the exhaust admitted to the muffler and a vacuum created in the cylinder to move the diaphragm head and apply the brakes.

In testimony whereof I hereunto affix my signature in the presence of two witnesses.

EARL R. HERREN.

Witnesses:
C. R. VAN DEUSEN,
F. J. STACK.